United States Patent [19]
Zahid

[11] 3,918,693
[45] Nov. 11, 1975

[54] SHOCK ABSORBER

[75] Inventor: Abduz Zahid, Los Angeles, Calif.

[73] Assignee: Greer Hydraulics, Inc., Los Angeles, Calif.

[22] Filed: Oct. 21, 1974

[21] Appl. No.: 516,769

[52] U.S. Cl. .............. 267/64 R; 188/287; 188/298; 188/322; 267/34
[51] Int. Cl.² ...... F16F 9/00; F16F 9/10; F16F 9/34
[58] Field of Search .......... 188/298, 287, 315, 322, 188/318; 267/64 R, 34

[56] References Cited
UNITED STATES PATENTS

| | | | |
|---|---|---|---|
| 2,802,664 | 8/1957 | Jackson | 188/298 X |
| 2,973,195 | 2/1961 | Armstrong | 267/64 R X |
| 3,419,114 | 12/1968 | Rumsey | 188/287 X |
| 3,556,268 | 1/1971 | Fister et al. | 188/287 X |
| 3,693,767 | 9/1972 | Johnson | 188/318 X |

FOREIGN PATENTS OR APPLICATIONS

| | | | |
|---|---|---|---|
| 18,898 | 6/1970 | Japan | 188/322 |

Primary Examiner—George E. A. Halvosa
Attorney, Agent, or Firm—Arthur B. Colvin

[57] ABSTRACT

This invention relates to a shock absorber of the type comprising a cylindrical outer casing having a closed mouth and also being closed at the other end, the closed end having an axial port. Positioned in the outer casing and extending longitudinally thereof is an inner casing of smaller diameter than the outer casing to define a chamber therebetween, the inner casing having one end closed by a plug and the other end closed and longitudinally spaced from the end of the outer casing, the bore of the inner casing slidably mounting a piston having an axially extending piston rod secured at one end thereto, with the other end of the piston rod protruding through an axial bore in the plug and normally resiliently urged outwardly. The piston rod has valve controlled means to permit flow of fluid from the portion of the inner casing bore adjacent the closed end of such casing to the portion of the inner casing bore on the other side of the piston and to restrain flow in the opposite direction. In addition, perforations are provided in the wall of the inner casing to permit flow of fluid from one side of the piston through the perforations to the other side of the piston. A bladder of resilient material encompasses the major portion of the length of the inner casing and the closed end of the bladder mounts a valve member which is axially aligned with an axial bore in the closed end of the inner casing and normally urged against the valve seat defined by the outer end of said axial bore. Adjustment means accessible from the exterior, through the axial port in the closed end of the outer casing is provided to determine the amount of movement of the valve means away from the valve seat defined at the outer end of the axial bore in the closed end of the inner casing.

6 Claims, 2 Drawing Figures

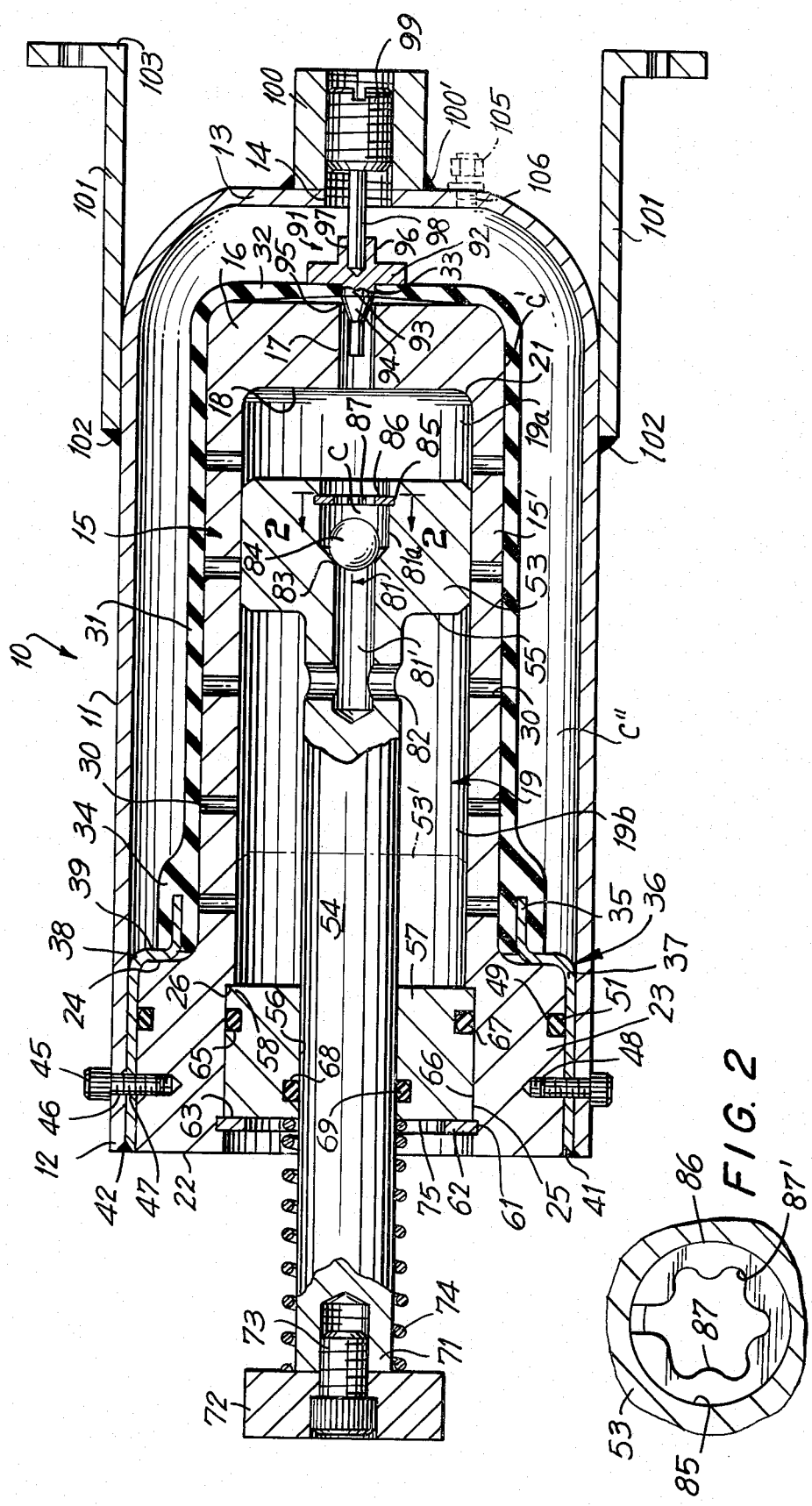

SHOCK ABSORBER

As conducive to an understanding of the invention, it is noted that where shock absorbers are required to withstand and absorb large forces suddenly exerted thereagainst, they generally must be large in size and where valves are used to permit movement of the fluid therein in one direction to absorb the shock and in the opposite direction to permit return of the fluid to the original normal condition, the valves are relatively complex and likely to jam and become out of order.

In addition, it is essential for most effective shock absorption that the shock absorbing action initially be rapid and then rapidly decelerate.

Where a shock absorber is effective for one type of application of a given installation on which it is installed, unless the device is readily adjustable without disassembly it may not be efficient to handle different types of operation.

It is accordingly among the objects of the invention to provide a shock absorber that is relatively simple in construction and has relatively few parts which may readily be assembled at relatively low cost and which are not likely to become deranged even with long use under severe shock conditions and which may readily be adjusted without disassembly to vary the rate of deceleration of the piston and piston rod thereof against which the shock force is exerted in use.

According to the invention these objects are accomplished by the arrangement and combination of elements hereinafter described and more particularly recited in the claims.

In the accompanying drawings in which is shown one of various possible embodiments of the several features of the invention:

FIG. 1 is a longitudinal sectional view of a shock absorber according to one embodiment of the invention, and FIG. 2 is a detail sectional view taken along line 2—2 of FIG. 1.

Referring now to the drawing, the shock absorber 10 comprises a substantially cylindrical rigid outer casing 11 of steel, aluminum or other material capable of withstanding the stresses to which it will be subjected in use. One end 12 of the casing is open and the other end illustratively is spun inwardly to define a flat extremity 13 having an axial opening or port 14.

Positioned in the outer casing 11 is a substantially cylindrical inner casing 15 also of rigid material such as steel, aluminum or the like which is capable of withstanding the stresses to which it will be subjected in use.

The inner end of the casing 15 is closed defining a transverse end wall 16 having an axial port 17, the periphery of the floor 18 of the bore 19 of the casing 15 being rounded as at 21.

The mouth 22 of casing 15 is of enlarged diameter as at 23 to define an annular shoulder 24, the portion of the inner casing 15 between shoulder 24 and end wall 16 defining the body 15' of the casing 15, said body portion 15' having a plurality of longitudinally spaced perforations 30 extending transversely therethrough. The inner wall of the bore 19 of casing 15 adjacent its mouth 22 is of enlarged diameter as at 25 to define an annular shoulder 26.

Encompassing the body portion 15' of the casing 15 is a deformable, expandible bladder 31 of natural or synthetic rubber having like characteristics. The bladder 31 is closed at one end as at 32 and said closed end has an axial opening 33.

The mouth of the bladder 31 has a thickened annular rim portion 34 in which is embedded the annular mounting portion 35 of a supporting ring 36. The ring 36 illustratively is of sheet metal and has a cylindrical retaining portion 37 inwardly bent at its inner end 38 to define an annular shoulder 39, the mounting portion extending from the end of said shoulder.

As is shown in the drawing, the bladder assembly including the bladder 31 and supporting ring 36, is positioned in the inner casing 15. The cylindrical portion 37 of supporting ring 36 is of diameter just slightly less than that of the mouth 12 of outer casing 11 so that it will readily fit therein.

Illustratively the portion 37 is inserted into the mouth 12 of casing 11 until the outer edge 41 of portion 37 is flush with the outer edge of mouth 12 and said outer edges are then secured as by welding at 42.

With the bladder assembly thus mounted in the outer casing 11, the closed end 32 of the bladder 31 will be longitudinally spaced from the end 13 of casing 11. Thereupon the inner casing 15 is inserted into the bladder assembly. The length of the inner casing 15 is such that when the annular shoulder 24 of the inner casing 15 abuts against annular shoulder 39, the end wall 16 of casing 15 will abut against end wall 32 of the bladder 31, slightly stretching the bladder 31 longitudinally and the diameter of bladder 31 is such that it will snugly engage the inner casing 15.

The inner casing is releasably secured to the outer casing 11 and the supporting ring 36 by means of screws 45, extending through openings 46 in the outer casing 11 adjacent its mouth and through aligned openings 47 in the cylindrical portion 37 and threaded into threaded bores 48 in the enlarged diameter portion 23 of the inner casing 31.

To provide a seal between enlarged diameter portion 33 and cylindrical portion 37, an annular groove 49 is provided in enlarged diameter portion 23 in which an O-ring 51 is positioned.

Slidably mounted in the bore 19 of inner casing 15 is a piston 53 having a piston rod 54 extending axially from the outer surface 55 thereof. The piston rod 54 extends through an axial bore 56 in a plug 57 secured in the open end of inner casing 15.

As is clearly shown, the plug 57 has its inner periphery 58 seated on annular shoulder 26. In order releasably to retain the plug 57 on shoulder 26, an annular groove 61 is provided in the bore of inner casing 15 adjacent its mouth 22 and a snap ring 62 is positioned in said annular groove 61 reacting against the outer periphery 63 of plug 57.

In order to provide a seal between the plug 57 and the enlarged diameter portion 25 of the inner casing 15 an annular groove 65 is provided in the side wall 66 of the plug 57 in which an O-ring 67 is positioned. In order to provide a seal between the plug 57 and piston rod 54, an annular groove 68 is provided in the bore 56 of plug 57 in which an O-ring 69 is positioned.

Means are provided normally to urge the piston 53 and piston rod 54 outwardly to extended position. For this purpose, as illustratively shown, the end 71 of the piston rod 54 has an abutment plate 72 secured thereto as by screw 73. A coil spring 74 encompasses the portion of the piston rod between plate 72 and the outer surface 75 of plug 57 and is compressed therebetween.

The piston 53 has an axial bore 81 extending therethrough and into the adjacent portion of piston rod 54 as at 81'. The bore portion 81' is intersected by a transverse bore 82 extending through the piston rod 54. The inner end of bore 81 is of enlarged diameter as at 81a defining a seat 83 for a ball valve 84, said enlarged diameter portion 81a defining a chamber for said ball valve 84.

In order to retain the ball valve in the chamber C, the latter has an annular groove 85 in the wall thereof in which a snap ring 86 is positioned, the snap ring as shown in FIG. 2 having an undulating inner periphery 87 which is of diameter such as to restrain passage of the ball valve 84 yet permit flow of liquid around the ball and out of the chamber C then through the recesses 87' defined by such undulations when the ball valve is abutting against the snap ring in the manner hereinafter described so that a one way "check" valve will be provided.

In the illustrative embodiment shown, a valve member 91 is molded integrally with the bladder 31. More particularly as shown in FIG. 1, the valve member 91 comprises a metal disc 92 having a cylindrical axial boss 93 on the inner surface thereof which fits into the axial opening 33 in end wall 32 of bladder 31. The disc 92 and boss 93 are molded integrally with the bladder 31 so as to be securely affixed thereto. Extending axially from boss 93 and formed integrally therewith, is a tapered valve member 94 normally urged by the resiliency of end wall 32 of the bladder 31, against the valve seat 95 defined by the outer periphery of axial port 17 in end wall 16 of inner casing 15.

Means are provided to permit movement of valve member 94 away from its seat 95 a predetermined amount. To this end the outer surface of disc 92 has an axial sleeve 96 extending outwardly therefrom, the bore of which slidably receives the end portion of an adjustment pin 98 which is secured to and extends axially from an externally threaded screw 99, screwed into an internally threaded sleeve or fitting 100 secured as by welding at 100' to the outer surface of end wall 13 of outer casing 11 and extending axially of port 14.

To mount the device above described a plurality of support straps 101 are provided secured as by welding at 102 to the casing 11, each of the straps 101 having mounting flanges 103 at their outer ends.

In the operation of the device prior to installation of the piston 53, piston rod 54 and plug 57, with the device in vertical position, the interior or bore portion 19a of the inner casing 15 is filled through open mouth 22 say to the level of the annular shoulder 26 with a hydraulic oil compatible with the material from which the bladder 31 is formed. As the valve member 94 is retained against its seat 95 no oil will flow through port 17. The plug 57 is then positioned in the open mouth 22 of inner casing 15 and secured in position by snap ring 62.

As a result of the oil filling the bore 19 and the force exerted by coil spring 74, the piston 53 will be in the extended position adjacent plug 57 as shown at 53' in broken lines in FIG. 1 and the piston rod 54 will be fully extended from the bore 56 of plug 57.

As force is applied against the end 71 of piston rod 54, the piston will tend to move inwardly (to the right referring to FIG. 1) thereby displacing the fluid from the bore portion 19a to the right of piston 53 through the bore 81 of piston 53. However, due to the ball valve 84 which will move against its seat no oil will flow through bore 81.

However, due to the perforations 30 in the wall of casing 15, the oil in bore portion 19a to the right of piston 53 will flow through such perforations into the chamber C' defined between the outer surface of inner casing 15 and the bladder 31 and then will flow back through such perforations 30 to the bore portion 19b on the left side of the piston. Initially, since the bores 30 aligned with piston 53 will be closed by the piston 53, all of the oil forced through the bores 30 to the right of the piston will be accommodated in chamber C'. Due to the relatively small size of the perforations 30, the speed of movement of the piston 53 and piston rod 51 will be dampened. If the force should be maintained and increased, the piston 53 will move further into the bore 19a (to the right). As a result less and less of the perforations 30 to the right of the piston 53 will be exposed to the flow of fluid from bore portion 19a and the rate of movement of the piston 53 and piston rod 54 will be further decelerated.

Consequently, the piston and piston rod will first move at a faster speed due to the fact that more of the bores 30 are initially exposed to the right of the piston 53 and thereupon as the piston moves further inward into the bore 19 of inner casing 15 the speed of movement will be decreased as fewer bores 30 will be exposed to the right of the piston 53.

It is apparent that the rate of deceleration will be a constant since the number of bores 30 exposed for fluid flow will be solely a function of the inward movement of the piston which cannot be charged once the device is assembled.

Means are provided to vary the rate of deceleration externally of the unit.

For this purpose it is apparent that if the screw 99 is rotated from the exterior so that it is moved inwardly, it will cause the pin 98 to move inwardly in the bore 97 of sleeve 96 until it abuts against the bottom of such bore thereby forcing valve 94 against its seat 95. As a result only the bores 30 will provide access for flow of oil from the bore 19a of the inner casing 15.

If the screw 99 is rotated in the opposite direction, the pin 98 will be withdrawn from bore 97 of sleeve 96 so that the valve 94 will be free to move away from its seat 95. Thus when the piston 53 is moved inwardly (to the right referring to FIG. 1) the pressure on the oil in bore portion 19a will, in addition to forcing oil from bore portion 19a into chamber C' also force oil through port 17 into chamber C'.

By regulating the setting of screw 99, for example by moving it outwardly, the amount of displacement of valve 94 away from its seat 95 can be varied so that a quantity of oil can flow through port 17 into chamber C', the amount being determined by the amount of displacement available to the valve 94 away from its seat 95. Thus the greater the amount of oil that flows through port 17, the faster will be the rate of movement of piston 33 and piston rod 54 and hence the slower will be the rate of deceleration.

When the force applied to piston rod 54 is reduced or removed, the tensed coil spring 74 will urge the piston rod 54 and piston 53 outwardly or to the left referring to FIG. 1.

As the piston moves to the left, pressure will be applied to the oil in the portion 19b of the bore of inner casing 15. As a result, such oil will flow back through the bores 30 into chamber C', displacing the resilient bladder outwardly and oil will also flow through transverse bore 82, and axial bore 81' to move the ball valve 84 off its seat 83 so that the oil will pass through the recesses 87' in the inner periphery 87 of snap ring 86 into the bore portion 19a.

Consequently, the return of the piston 53 and piston rod 54 to their extended position will occur rapidly.

It is also within the scope of the invention to pressurize the chamber C'' defined between the bladder 31 and the outer casing 11 to cause return of the piston 53 and piston rod 54 to their extended position. In such case the spring 74 may be eliminated. This may be accomplished by applying gas under pressure through a valve 105 mounted in a port 106 provided in end wall 13.

Thus when the piston 53 is moved to the right, due to the fact that the piston rod occupies a considerable portion of the volume of the bore portion 19b to the left of the piston 53, all of the oil discharged from bore portion 19a cannot be accommodated in bore portion 19b, and such excess oil will be accommodated in chamber C'. As a result the bladder 31 will expand compressing the gas in chamber C'' so that when the force applied to piston rod 54 is reduced or removed, the oil under pressure in chamber C', due to the gas pressure in chamber C'', will be forced through bores 30 into bore portion 19b, then through bores 82, 81 past valve 84 into bore portion 19a. As a result the piston 53 and piston rod 54 will be moved to extended position to the left.

Having thus described my invention, what I claim as new and desire to secure by Letters Patent of the United States is:

1. A shock absorber comprising and outer cylindrical casing closed at one end and having a mouth at its other end, an inner cylindrical casing closed at one end and having a mouth at its other end, said inner casing being positioned in said outer casing coaxial therewith and transversely placed therefrom to define an elongated annular chamber, said inner casing having a body portion having passageways therethrough, an elongated resilient deformable and expandible substantially cylindrical bladder positioned in said annular chamber and extending substantially the length thereof and encompassing said inner casing to define a variable volume liquid chamber between the inner casing and said bladder, said bladder being closed at one end and having a mouth at its opposed end, an annular supporting member of rigid material having a cylindrical retaining portion and a reduced diameter mounting portion, the junction between said portions defining an annular shoulder, the mouth of said bladder being secured to said mounting portion, the portion of said inner casing adjacent its mouth being of enlarged diameter, the junction between said enlarged diameter mouth portion and the body portion of said casing defining an annular shoulder, said annular supporting member being positioned in the mouth of the outer casing with the cylindrical retaining portion in juxtaposition with the wall of the outer casing, said enlarged diameter mouth portion of the inner casing being positioned in said supporting member with the outer surface of said enlarged diameter portion of said inner casing in juxtaposition with the wall of the cylindrical retaining portion and with the annular shoulder of the enlarged diameter mouth portion abutting against the annular shoulder of said supporting member and means to retain said inner casing and said annular supporting member in fixed sealed position with respect to the outer casing, a closure member having an axial bore, positioned in the mouth of said inner casing, means retaining said closure member in fixed position, a piston slidably mounted in said inner casing, said piston defining a variable volume chamber on each side thereof, said piston having a piston rod extending axially therefrom through the axial bore in the closure member, check valve means to permit flow of liquid only from one of said chambers to the other, and means to extend said piston rod outwardly from said closure member.

2. The combination set forth in claim 1 in which the outer edge of the annular supporting member is flush with the mouth of the outer casing and weld means are provided to retain said outer edge and mouth in fixed position and to define a seal.

3. The combination set forth in claim 1 in which screw extends transversely through the outer casing adjacent its mouth and through said supporting member into a threaded bore in the enlarged diameter portion of the inner casing.

4. A shock absorber comprising an outer cylindrical casing closed at one end and having a mouth at its other end, an inner cylindrical casing closed at one end and having a mouth at its other end, said inner casing being positioned in said outer casing coaxial therewith and transversely placed therefrom to define an elongated annular chamber, said inner casing having a body portion having passageways therethrough, an elongated resilient deformable and expandible bladder positioned in said annular chamber and extending substantially the length thereof and encompassing said inner casing to define a variable volume liquid chamber between the inner casing and said bladder, said bladder being closed at one end and having a mouth at its opposed end, said bladder snugly engaging the body portion and closed end of said inner casing, said closed end of said inner casing having an axial bore therethrough, the outer end of which defines a valve seat, a valve member secured to the closed end of the bladder and extending axially thereinto and normally seated on said valve seat to close the latter, means securely retaining the mouth of said bladder in fixed position adjacent the mouths of said casings, means securely retaining the mouth of said inner casing in fixed sealed position with respect to the mouth of said outer casing, a closure member having an axial bore, positioned in the mouth of said inner casing, means retaining said closure member in fixed position, a piston slidably mounted in said inner casing, said piston defining a variable volume chamber on each side thereof, said piston having a piston rod extending axially therefrom through the axial bore in the closure member, check valve means to permit flow of liquid only from one of said chambers to the other, and means to extend said piston rod outwardly from said closure member.

5. The combination set forth in claim 4 in which means are provided to limit the movement of said valve member away from its seat.

6. The combination set forth in claim 4 in which the closed end of said outer casing has an axial opening, an internally threaded sleeve extends axially outward from the closed end of said outer casing and is aligned with said axial opening in said outer casing, said valve member has a rigid member extending axially outward from the closed end of said bladder, said rigid member having an axial bore extending partially thereinto, a threaded adjustment screw is positioned in said threaded sleeve to coact therewith, said screw having an axial stem secured at one end to the inner end of said screw with the other end of said stem slidably mounted in the bore of said rigid member.

* * * * *